Jan. 12, 1960   A. S. JOUKAINEN ET AL   2,920,347
SEALING MEANS FOR ROTARY PUMPS
Filed Dec. 2, 1955   2 Sheets-Sheet 1
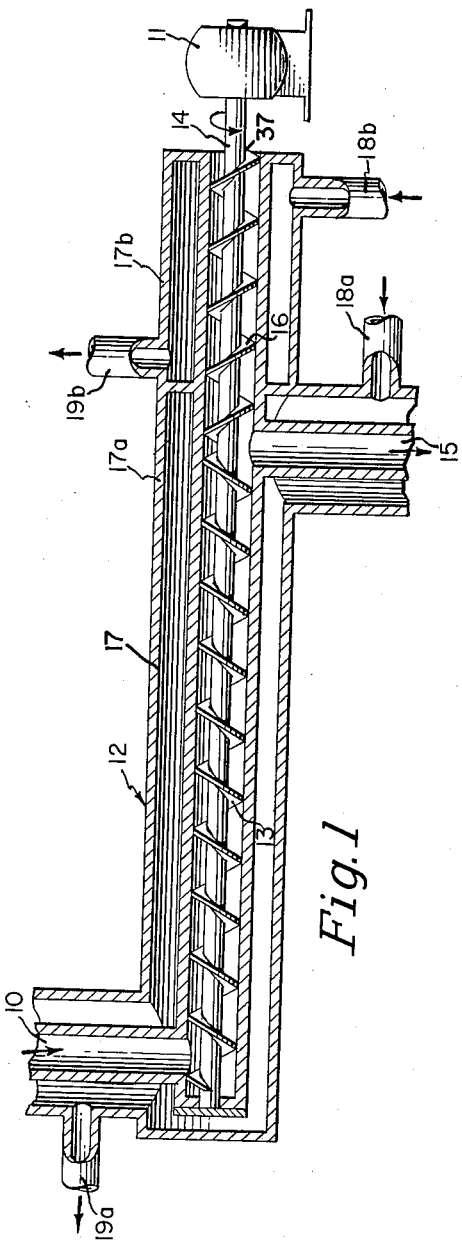
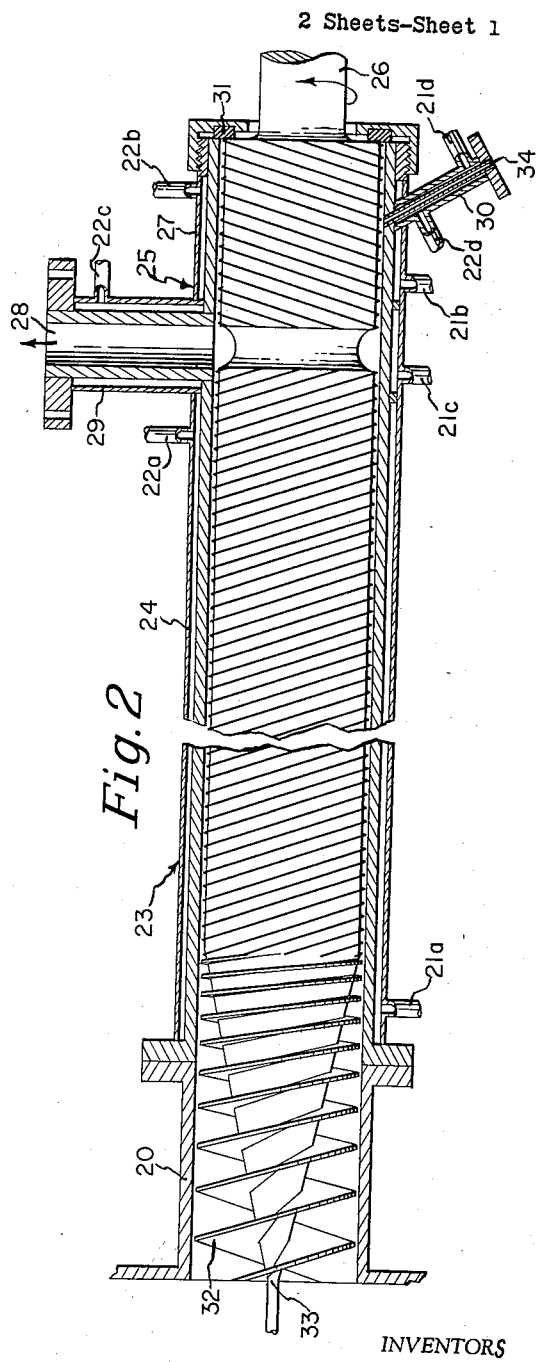
INVENTORS
A. S. JOUKAINEN
P. J. MOROZ
E. C. SUTTON
BY Herbert M Wolfson
ATTORNEY

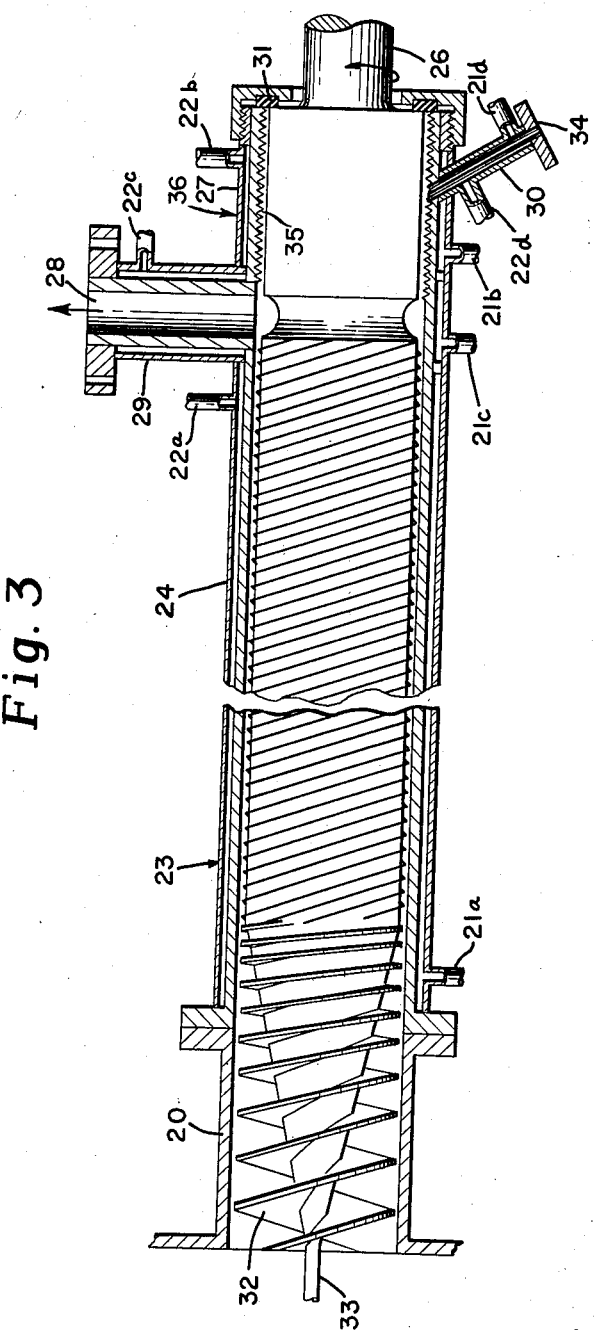

2,920,347
SEALING MEANS FOR ROTARY PUMPS

Arnold Simon Joukainen, Wilmington, Peter Joseph Moroz, Newark, and Edwin Clifton Sutton, Wilmington, Del., assignors to E. I. du Pont de Nemours and Company, Wilmington, Del., a corporation of Delaware Application December 2, 1955, Serial No. 550,634

8 Claims. (Cl. 18—12)

This invention relates to a rotary pump. More particularly, it relates to an improved sealing means for operating a rotary screw pump at high temperature and high pressure.

The present invention will be described for a rotary screw pump used in the extrusion of viscous polymeric materials. However, the invention is not so limited but applies to any rotary pump to prevent leakage through the seal.

In the extrusion of viscous polymeric materials, the material is usually fed into a cylindrical casing or pump housing. Within the casing a screw or worm mounted on a rotatable shaft advances the material from the point of entry to a discharge port. While advancing the material, the screw also serves to raise the pressure on the material. Ordinarily, pressures of the order of 2,000 p.s.i. or higher are developed at temperatures of 250° C. and higher. Attempts to seal the opening through which the rotatable shaft extends from the casing or pump housing have met with little success. The materials commonly used in ordinary stuffing boxes are not adequate to withstand the high temperature and high pressure developed within the pump. Furthermore, stuffing boxes tend to impose a frictional load upon the rotatable shaft.

An object of this invention is a novel seal for rotary pumps, particularly for screw pumps. Another object is a seal for use in a screw pump operating at high pressure and high temperature. A further object is a seal for use in a screw pump, which pump is used to advance viscous polymeric material. A still further object is a seal, the leakage through which can be substantially eliminated and contamination of the material being pumped controlled. Other objects will appear hereinafter.

The objects are accomplished by a seal comprising a screw flight on the rotatable shaft opposite in pitch to the advancing screw flight, the seal screw flight located between the discharge port and the opening through which the shaft enters the casing or pump housing in combination with adjustable bleed means located in the housing surrounding the seal screw flight to prevent contamination of material being pumped with the material in the seal section (the so-called leakage material). Preferably, the area surrounding the oppositely pitched seal screw flight is at a lower temperature than the area surrounding the advancing screw flight.

In more general terms, the invention involves a seal structure for a rotary pump comprising: a housing extension on the pump through which the pump drive extends; a seal element within the housing of larger diameter than the drive shaft, concentric and rotatable therewith having a helical screw flight in its cylindrical surface to counteract the escape of leakage material; and adjustable bleed means located within the housing to prevent contamination of the material being pumped with the leakage material.

While the above comprises the essential features of the invention, it is preferable to add the following element when operating with viscous materials such as polymeric materials to be extruded. Since the viscosity of the polymeric material is sensitive to temperature variation, it is preferable to use temperature control means to control the temperature of the material in the seal and in the advancing section separately. In this way, the material in both sections can be the same polymeric material, but the polymeric material being pumped can be at a lower viscosity than that necessary to provide an effective seal in the seal section.

The invention will be better understood and additional objects and advantages will become apparent from the following description taken in connection with the accompanying drawings which illustrate specific embodiments.

Figure 1 is a diagrammatic plan view of an apparatus employing the sealing system invented.

Figure 2 is a side elevation of a preferred embodiment for extruding viscous polymeric materials.

Figure 3 is a side elevation of another embodiment.

In the apparatus shown in Figure 1, plastic material at relatively low pressure (about 2 millimeters mercury absolute pressure) is fed into the cylindrical casing or pump housing, 12, through the opening, 10, where the casing is in hopper form. The main body of the casing is in the form of a cylindrical bore. Within the casing is mounted a screw or worm feed, 13, on a rotatable shaft, 14, protruding through one end of the casing. The other end of the shaft may be journalled in a bearing. The shaft is driven in any desired manner such as a motor, 11, as shown, to advance material from the feed opening, 10, to the discharge port, 15. As the material is advanced, the pressure on it is increased by the action of the screw feed. To accentuate this increase in pressure, the pitch of the screw flights may become steeper and the diameter of the central shaft portion may be progressively increased if desired. The pressure of the outlet may be as high as 2000 p.s.i. or higher. Immediately past the discharge opening is an extension of the pump housing to house the helical screw flight, 16, whose pitch is opposite to that of the advancing screw flight, 13. The drive shaft, 14, of the pump enters through the opening, 37.

An important element in this invention is the adjustable bleed port, 34. The bleed is used to remove excess material, which in the present case is primarily degraded polymer. This material, if left in the pump, would tend to contaminate the polymeric material being pumped and, further, would tend to bind the rotatable pump shaft.

As indicated in Figure 1 the apparatus may also be provided with a jacket, 17, divided into two sections, 17a and 17b, to control independently the temperature of the advancing section and the seal section. The temperature control liquids enter at 18a and 18b and leave at 19a and 19b. By regulating the temperature in the seal section, the viscosity of the material can be adjusted so that the reverse screw pressure is substantially equal to the pumping pressure. Preferably, the pressure in the advancing section is slightly greater than the pressure in the seal section to provide additional insurance against contamination of the material leaving at the outlet, 15, with material from the seal section.

The operation of this system will be described as it may be used in the continuous production of polyethylene terephthalate. The particular apparatus is shown in Figure 2. Molten polyethylene terephthalate is fed from the finisher section, 20, by a worm consisting of a double screw flight, 32, with decreasing pitch on a shaft, 33, of increasing diameter into the advancing section, 23, of the screw pump. The pressure on the material at the entrance to the advancing section is about 2 millimeters of mercury and the temperature within the advancing section is maintained at about 280° C. by means of liquid flowing in the surrounding jacket, 24. The liquid enters at 21a and leaves at 22a. During start-up, the temperature of the seal section, 25, is also kept high to permit the filling of the seal section with polymer by the pressure developed in the advancing section and to facilitate starting the rotation of the shaft, 26, and worms thereon. The temperature in the seal section is then lowered to a temperature about 5–10° C. below the temperature of the polymer in the advancing section by means of liquid in jacket, 27. The liquid enters at 21b and leaves at 22b. This serves to increase the viscosity of the polymer and to provide a seal. During the remainder of operation the temperature of the seal section is maintained from 5–25° C., below the temperature of the advancing section, at about 260° C., depending on the pressure developed in the advancing section.

The advancing and seal sections are composed of oppositely pitched octuple screw flights on the rotatable shaft, 26. The shaft is free of screw flights adjacent to the discharge outlet, 28, for a distance equal to the diameter of the outlet. The length of the advancing section may vary from 2 to 5 times the length of the seal section. In the device being described, the advancing section is about 5 feet long, the first foot of which is devoted to merely guiding the material without increasing its pressure; the seal section is about 1 foot long; and the length free of screw flights (corresponding to the diameter of the outlet) is about 3 inches. The minor diameter in the seal section (corresponding to the diameter of the shaft in this section) is slightly greater than the minor diameter in the advancing section. However, the major diameters (to the outer edges of the screw teeth) in both sections are substantially equal. Thus, the teeth in the seal section are shorter and the free area per unit length is less than in the advancing section to provide greater confinement of material in the seal section. A minimum clearance of about .006 inch is provided between the outer edges of the teeth (major diameter) and the inner diameter of the casing.

In practice, it has also been found advisable to control the temperature of the polymer discharge port, 28. Liquid flows through the jacket, 29, to maintain the temperature about 5° C. higher than in the advancing section, i.e., 285° C. in the present case, to facilitate the discharge of material. The liquid enters at 21c and leaves at 22c. Furthermore, the bleed port, 34, used to bleed excess, primarily degraded polymer from the seal section and prevent contamination of the material being pumped out the discharge, 28, may also be jacketed with liquid at a temperature about 10° C. higher than in the advancing section, i.e., 290° C. To be reasonably certain that no contamination is occurring, it is important that material bleed through the port, 34, continuously. The liquid for heating the bleed port enters jacket, 30, at 21d and leaves at 22d. Asbestos packing, 31, may be used to insure a complete seal although such packing is not absolutely necessary. Dowtherm has been used as the heating liquid flowing through the various jackets. However, high boiling oils or gases such as steam and the like may also be used.

In the following table are presented some typical results for pumping polyethylene terephthalate.

| Screw Speed, Revolutions/minute | Pumping Pressure, lbs./sq. in. | Advancing Section, Temperature, °C. | Seal Section, Temperature, °C. |
| --- | --- | --- | --- |
| 14 | 230 | 275 | 270 |
| 35.5 | 770 | 278 | 270 |
| 54 | 1,000 | 282 | 272 |
| 84 | 1,620 | 278 | 263 |

The precise temperature used for the seal section will depend on the pressure developed in the advancing section which pressure will depend on the rotational speed of the screw and the viscosity of the polymer. For polyethylene terephthalate at about 280° C. the viscosity will range from 1000–3000 poises depending on the degree of polymerization. In general, it may be stated that the temperature in the seal portion should be between 5–25° C. less than the temperature in the advancing section when developing a pressure of 1500 to 2000 p.s.i. to prevent leakage through the seal section.

In Figure 3 is shown an equivalent of the described embodiments. In this embodiment, the elements of the apparatus are identical to those shown in Figure 2 except that spiral grooving, 35, is provided on the inner cylindrical surface of pump housing extension, 36, instead of the helical screw flight on the pump drive shaft (as in Figure 2) to counteract the escape of leakage material around the shaft.

Another innovation may be used to shorten the overall length of the screw pump and yet develop the desired pressure. Threads in the internal surface of the barrel (spiral grooving) opposite in pitch to the threads of both screw flights on the shaft may be machined to cooperate with the screw flights on the shaft. In all other respects the design would be that of this invention.

Although the total prevention of leakage can be accomplished by this invention, in practice when working with polymeric materials, it has been found necessary to leak polymeric continuously through the bleed to reduce degradation of the polymer in the screw threads. Although octuple flights of helical threads are shown in the preferred embodiment, anywhere from 6 to 12 may be used with satisfactory results.

The apparatus is useful for the treatment of all materials but is particularly useful for developing high pressures when advancing polymeric materials such as polyethylene terephthalate, polyethylene, etc., at high viscosities and temperatures.

Its main advantage lies in its basic simplicity and its adaptability to a variety of situations. The seal can be made completely leak proof or partially leak proof like the seal in a centrifugal water pump. The shaft may be continuous or the advancing section may be detachable from the seal section for ease of cleaning and maintenance.

As many different embodiments of this invention may be made without departing from the spirit and scope thereof, it is understood that the invention is not limited except as defined in the appended claims.

What is claimed is:

1. In a screw pump for advancing viscous polymeric material from the inlet of said pump to the outlet of said pump wherein a shaft, rotatably driven from outside said pump, enters said pump at a point beyond said outlet and wherein a helical screw flight on said rotatable shaft advances the polymeric material from said inlet to said outlet and increases the pressure thereon: improved sealing means for the entrance of said rotatable driven shaft comprising said polymeric material under pressure disposed between said outlet and the entrance of said shaft into the pump, the pressure on the polymeric material of said sealing means opposed to the pressure in the advancing section, and adjustable bleed means disposed between said outlet and the entrance of said shaft into the pump adapted to prevent contamination of the material being advanced with the material of said sealing means.

2. In a screw pump for advancing viscous polymeric material from the inlet of said pump to the outlet of said pump wherein the shaft rotatably driven from outside said pump enters said pump at a point beyond said outlet and wherein a helical screw flight on said rotatable shaft advances the polymeric material from said inlet to said outlet and increases the pressure thereon: improved sealing means for the entrance of said rotatable drive shaft comprising a helical screw flight opposite in pitch to the pitch of the advancing screw flight mounted on said rotatable shaft disposed between said outlet and the entrance of said shaft into the pump and adapted to contain said polymeric material; and adjustable bleed means disposed between said outlet and the entrance of said shaft into the pump adapted to prevent contamination of the material being advanced with the material of said sealing means.

3. A screw pump as in claim 2 having temperature control means adapted to control the temperature of the polymeric material in the advancing section of the pump and separate temperature control means adapted to control the temperature of the polymeric material of said sealing means independent of the temperature of the material in the advancing section.

4. A screw pump as in claim 3 wherein the polymeric material of the sealing means is maintained at a temperature 5-25° C. less than the temperature of the polymeric material in the advancing section.

5. A seal structure for a liquid rotary pump comprising: a rotatable drive shaft for the pump; a housing extension on the pump through which the pump drive shaft extends; a seal element within said housing extension of larger diameter than the shaft, concentric and rotatable therewith; said housing extension having spiral grooving in its inner cylindrical surface to cooperate with the seal element and counteract the escape of leakage material; an adjustable bleed means disposed within the housing extension adapted to prevent contamination of material being pumped with the leakage material.

6. A seal structure for a liquid rotary pump comprising: a rotatable drive shaft for the pump; a housing extension on the pump through which the pump drive shaft extends; a seal element within said housing extension of larger diameter than the shaft, concentric and rotatable therewith; said housing extension having spiral grooving in its inner cylindrical surface to cooperate with the seal element and counteract the escape of leakage material; means to control the temperature of the seal element and thus control the viscosity of the leakage material.

7. A seal structure for a liquid rotary pump comprising: a rotatable drive shaft for the pump; a housing extension on the pump through which the pump drive shaft extends; a seal element within said housing extension of larger diameter than the shaft, concentric and rotatable therewith; said housing extension having spiral grooving in its inner cylindrical surface to cooperate with the seal element and counteract the escape of leakage material; adjustable bleed means disposed within the housing extension adapted to prevent contamination of the material being pumped with the leakage material; and means to control the temperature of the seal element thus controlling the viscosity of the leakage material and leakage through the bleed means.

8. In a screw pump for advancing viscous polymeric fluids from sub-atmospheric levels to super-atmospheric levels wherein a helical screw flight on a rotatable shaft advances the polymeric material from inelt to outlet: a seal section comprising a smooth cylindrical shaft concentric and rotatable with said rotatable shaft disposed between said outlet and the entrance of said rotatable shaft into the pump casing, spiral grooving on the inner cylindrical surface disposed between said outlet and the entrance of said rotatable shaft into the pump casing adapted to cooperate with said smooth shaft to counteract the escape of material; adjustable bleed means in said seal section to prevent contamination of the advancing material with the material in the seal section.

References Cited in the file of this patent

UNITED STATES PATENTS

| | | |
|---|---|---|
| 1,504,658 | Ulmer | Aug. 12, 1924 |
| 1,770,496 | Lawaczeck | July 15, 1930 |
| 2,457,088 | Pinney | Dec. 21, 1948 |
| 2,458,068 | Fuller | Jan. 4, 1949 |
| 2,693,348 | Ellermann | Nov. 2, 1954 |

FOREIGN PATENTS

| | | |
|---|---|---|
| 559,713 | Great Britain | Mar. 2, 1944 |